March 8, 1938.  F. J. G. NEUMANN ET AL  2,110,577
APPARATUS FOR MAKING GEOPHYSICAL MEASUREMENTS
Filed Dec. 3, 1934   2 Sheets-Sheet 1
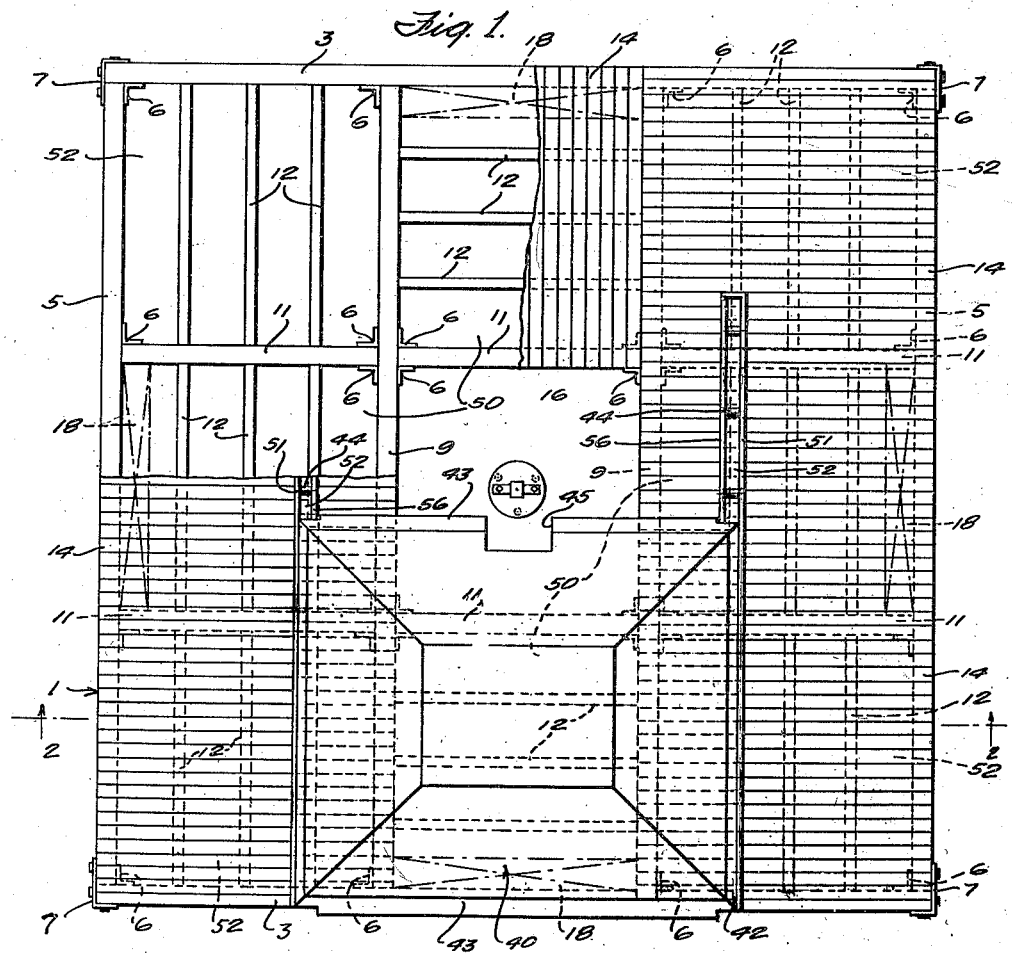
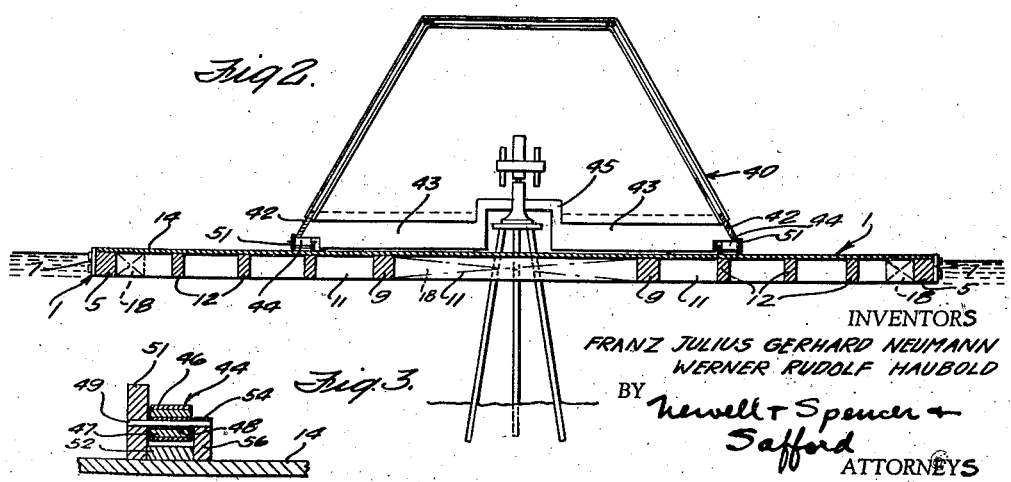
INVENTORS
FRANZ JULIUS GERHARD NEUMANN
WERNER RUDOLF HAUBOLD
BY Newell T Spencer &
Safford
ATTORNEYS

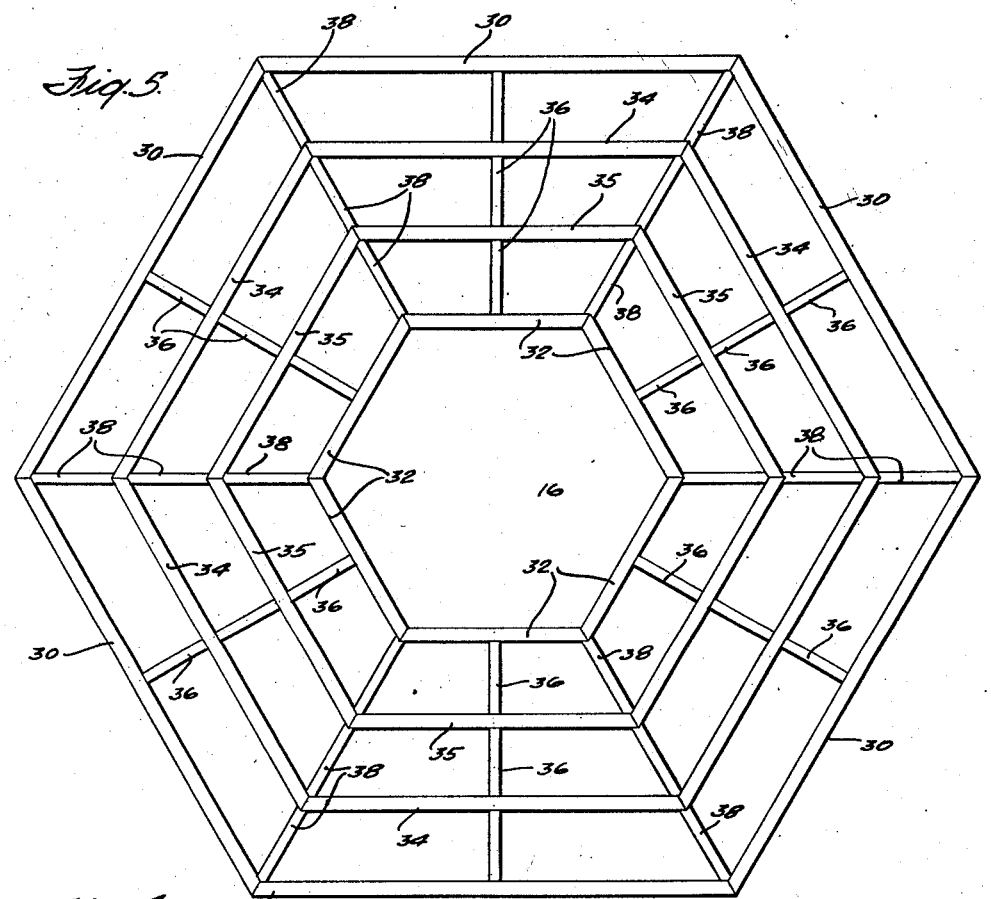
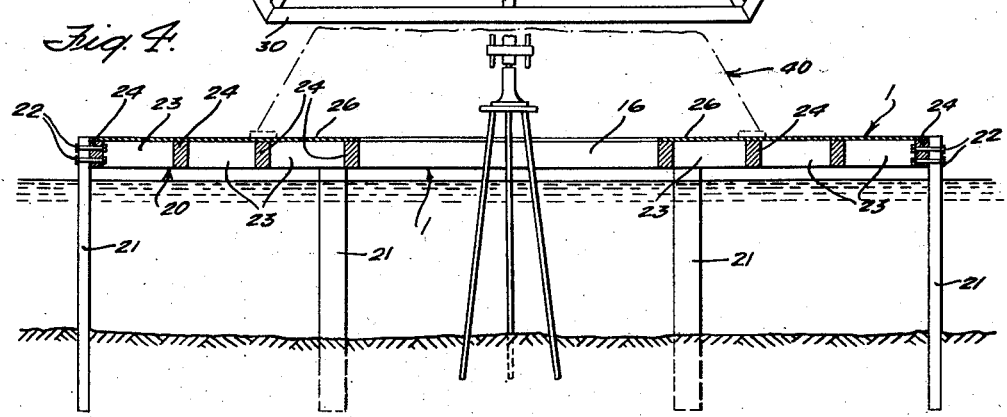

Patented Mar. 8, 1938

2,110,577

UNITED STATES PATENT OFFICE

2,110,577

APPARATUS FOR MAKING GEOPHYSICAL MEASUREMENTS

Franz Julius Gerhard Neumann and Werner Rudolf Haubold, Houston, Tex., assignors to The Salt Dome Oil Corporation, Houston, Tex., a corporation of Delaware Application December 3, 1934, Serial No. 755,740

13 Claims. (Cl. 265—1.4)

This invention relates to apparatus for making geophysical measurements and more particularly for making such measurements upon areas of the earth's surface which are covered by water. In our copending application, Serial No. 713,852, filed March 3, 1934, we have shown and described apparatus for making geophysical measurements upon areas of the earth's surface covered by water, upon which areas a geophysical instrument may not easily and accessibly be positioned with respect to the earth in the usual manner as on land. Said copending application discloses and claims such apparatus comprising a support for the geophysical instrument, which support is capable of being fixed to the earth bottom underlying the water, and a member constructed and positioned with respect to the support so as substantially to intercept forces caused by motion of the water and by the wind in order to prevent disturbances due to these forces from reaching the instrument.

In said prior copending application we have shown as one embodiment of the invention a float so constructed as to accomplish the shielding of the instrument and have suggested that preferably the float be constructed of wood because the specific gravity of wood is not greatly different from that of water, the purpose being to avoid the use of materials which would provide masses of greatly different density and therefore of greatly different gravitational force from that of the water surrounding the instrument. Especially in using an instrument having the sensitivity of a torsion balance for the purpose of making geophysical measurements it is desirable or necessary to avoid the introduction of such extraneous forces acting upon the instrument.

The present invention relates to a platform or float which may be used to shield the instrument and also to provide access to the instrument for the purpose of placing it upon its support and to effect adjustment and the reading and observation thereof, as disclosed in said copending application. The invention concerns the construction of the platform or float with materials or structural elements of a density not markedly different from that of water and particularly concerns the arrangement of these materials within the construction so as to avoid distortion or error due to the mass of the platform or float. The improvement of the present invention provides a platform or float in which the distribution of the mass of the platform may be symmetrical with respect to the instrument, that is, with respect to a median line or a median plane of the field of operation of the instrument on which line substantially the instrument is located. This improvement also has a feature the distribution of the material of the platform or float approximately uniformly or evenly throughout the extent thereof so that, especially in view of the symmetrical placement of the material, there will be no mass or masses of material of different size from that of other masses equidistant from the instrument, or masses of larger size closer to or further from the instrument than masses of smaller size. If such non-uniform distribution of the mass of the material were to exist in the platform or float distortion of the registration or of the indication of the instrument would be caused and error in the measurements would be introduced. In the preferred embodiment of the invention the mass of the material is distributed approximately uniformly or evenly in the horizontal plane and symmetrically about a vertical. In a practical embodiment, as in the platform and float of our copending application Serial No. 713,852, the mass of the material of the platform may completely surround the vertical and the platform may be constructed as with a central opening so that the float may be positioned in relation to the instrument with said vertical substantially coincident with the instrument.

By the expression "median line or median plane of the field of operation of the instrument" as above used, we mean substantially a line or plane passing through the instrument and dividing the field of operation, for example, as does a plane through the center of a sphere, if the field of operation is of three dimensions or the diameter of a circle, if the field of operation is in a plane; or if the field of operation is less than a sphere or a circle we mean substantially a bisector of the segmental portion thereof.

While in practice the actual form of the field may vary from such geometric definition, it will be understood that such variations are within the scope of the invention and that a median line or median plane may be determined for a particular field and the instrument may be set in this median line or plane, the platform or float being positioned and having the mass thereof distributed in the manner set forth above. In practice also departures to a certain degree from a mathematically determined median line or plane may be made while substantially conforming to the conditions under which the invention is to be used.

In contrast to the construction of our copending application, however, the platform or float is constructed without the formation of displacement chamber or chambers occupied by large volumes of air for the purpose of securing a floating vessel capable of bearing the weight of the observers and workman and of the equipment. In the present invention for buoyancy of the float as a whole reliance is placed on the buoyancy of the elements of which the float is constructed. This buoyancy preferably is obtained by utilizing in the construction materials which themselves are lighter than water though not markedly so and, as compared with air, have a density substantially approximating or approaching that of water. In some cases, however, we may utilize elements in the construction of the platform or float which, while made of materials heavier than water, are so formed as cells of limited volume containing air as to provide buoyancy for the elements. Such elements, however, in the form of cells or equivalent units of limited volume, may be distributed in the float uniformly or evenly and symmetrically with respect to the position of the instrument.

In a practical construction we have utilized wood timbers of relatively large size in order to provide sufficient mass of material capable of floating without the formation of a displacement chamber. The cross section and length of these timbers has been so chosen that, when assembled the platform will float upon the water because the density of the wood is somewhat less than that of water. We have found it possible so to construct the platform that when floating it will carry a flooring, which in the practical embodiment may also be of wood, and will bear the weight of several workmen and observers, also the weight of the instrument and of the support for holding the instrument, as well as the cover or tent necessary in making certain geophysical measurements, particularly those made with a torsion balance. The float may be constructed so that it will be stable when floating and while carrying the loads above referred to, and so that it may be transported as by towing without danger of capsizing or tilting undesirably when the workmen move about or the loads are shifted thereon.

The invention will now be more particularly described in connection with the drawings in which Figure 1 shows in plan the framing of the platform or float;

Figure 2 shows a cross section on line 2—2 of Figure 1;

Figure 3 shows a detail of the construction;

Figure 4 shows in section a modified form of the platform; and

Figure 5 shows in plan a modification of the invention.

Figure 1 shows a plan of the platform or float 1 which is constructed with beams 3 at opposite sides thereof. Between the beams 3 and adjacent the ends of the beams 3 are framed beams 5 to form a substantially square frame of the platform or float. The beams 3 and 5 may be spiked together where they are in abutment, as shown, and also may be held as by angle iron braces 6 placed in the inner corners formed by the abutting beams 3 and 5. Straps 7 may be fastened exteriorly of the joint of the beams 3 and 5 to increase the rigidity of the connection between said beams. Intermediate between the beams 5 and extending parallel thereto between the beams 3 are positioned beams 9 which are so spaced apart from each other and from said beams 5 that the spaces between these beams are substantially equal, as illustrated in Figure 1.

Transversely of the beams 5 and 9 and parallel to the beams 3 are short beams 11 framed between the beams 5 and 9 and also between the beams 9. These two lines of beams 11 are spaced apart and are spaced from the beams 3 so as to form spaces between these lines equal to the spaces between the beams 11 and the beams 3. The beams 9 may be spiked to the beams 3 and the beams 11 may be spiked to the beams 5 and to the beams 9 where, as shown in Figure 1, the ends of the respective beams abut a beam transverse thereto. The joints between the several abutting beams may be reinforced by angle irons 6 placed internally in the corners and fastened to the respective beams by suitable bolts or other fasteners.

Cut in between the beams and equally spaced in the substantially square openings formed therebetween are placed the floor beams 12. As may be seen from Figure 2, in the particular embodiment illustrated the floor beams 12 have a depth substantially equal to that of the beams 3, 5, 9 and 11. These floor beams may be spiked at their ends to the beams 3, 5, 9 and 11 in the usual manner in framing wood structures and beams. If desired they may be braced with angle irons as are the beams 3, 5, 9 and 11. While the main strength of the structure and its rigidity may be secured by the framing of the beams 3, 5, 9 and 11 and the rigid fastening together thereof by means of the angle irons 6 and by the straps 7, the floor beams 12, when properly fastened in place, add to the rigidity of the structure and as well serve to support the flooring 14, which may be laid transversely to the length of the beams 12 in the usual manner.

In a practical embodiment of the invention we have utilized for the beams 3, 5, 9 and 11 wood beams of fir or white pine which have been treated with creosote in order to retard rotting and deterioration thereof when in contact with the water and when subjected to moisture and air when not in use. The size of these beams may be about 30 feet in length and they may have nominal cross sectional dimensions of 8 inches by 10 inches. The beams 12 in such a practical embodiment may have a nominal cross section of 4 inches by 10 inches and may be of such length that they fit in between the beams 3, 5, 9 and 11, as shown in Figure 1. Three of such beams may be fitted in each square formed by the beams 3, 5, 9 and 11. There is thus provided in each beam as well as in the assembled structure a substantial volume of wood of a density which is capable of causing the structure to float with a sufficient portion thereof out of water to bear the flooring 14 without said flooring becoming submerged. The density of the wood, however, is not markedly different from that of water and is for most woods of the degree of approximately one-half that of water. The air which would occupy the space between the walls of a floating vessel or chamber at ordinary temperatures, would have a density of between .07 and .08 pound per cubic foot at atmospheric pressure. By comparison, the density of wood such as pine wood, on the other hand, is about 30 pounds per cubic foot while the density of water is about 62.5 pounds per cubic foot. Thus, while the density of wood approximates one-half that of water, the density of air approximates 1/800 that of water.

The sizes and dimensions of the beams as given above are merely typical. The platform or float may be made of larger or smaller size than 30 feet square and beams of larger or smaller cross section may be used. The number of these beams and their arrangement may be varied to suit different conditions while carrying out the symmetrical and even distribution of the masses thereof.

The beams 3, 5, 9, 11 and 12 are placed at intervals so that space is left for the water to find its level therebetween, there being no bottom fastened upon the under side of the beams and made water-tight so to prevent the water thus rising as would be the case with a displacement vessel. Thus intermediate the beams masses of water are interspersed and the difference between the density of the wood and of the water, particularly in view of the substantially uniform distribution of the mass of the wood accomplished by the construction as described, produces no masses of greatly different density adjacent the instrument which would cause error in its registration. With the construction of the present invention the instrument, supported in the open space 16 in the manner and for the purposes described in our copending application Serial No. 713,852, is surrounded by masses of water substantially evenly distributed in the horizontal plane and symmetrically with respect to the instrument. This result is obtained with the construction of the platform according to the present invention because these masses of water interspersed with masses of wood do not have a density markedly different from each other. Moreover, these masses of water and wood in interspersed relation also are substantially uniformly or evenly distributed in the horizontal plane and symmetrically around the central opening of the platform, that is, substantially symmetrically about a vertical at the center of said opening 16. The instrument, therefore, when placed upon a support within this opening, may substantially become positioned coincident with said vertical and may be uniformly and symmetrically acted upon by the masses of the beams of the platform and by the water masses interspersed therebetween without great difference in the gravitational forces created by said masses. With such a construction there will be no substantial concentration of masses of different density and such masses of different average density than that of water as are utilized for the purpose of obtaining buoyancy are of such limited size and are so distributed and interspersed with water masses as to create an average force acting upon the instrument not greatly different from that of the water with which it largely is surrounded. There is avoided also the difference in the mass attraction of the mass of water in the central opening 16, as in the construction of said copending application, and that of the air volumes in the displacement chambers.

The above description has been directed to a construction of the platform or float as a floating body supported with respect to the earth by its buoyancy on the water. In some uses of the invention, however, for example in tidal areas where the rise of tide may be sufficient to move the float upward or downward with respect to the instrument so as to cause change in the gravitational forces of the float which act upon the instrument, it may be necessary to support the platform 1, as shown in Figure 4, in which the platform 1 is supported upon struts or posts 21 fastened preferably by removable fastening means such as bolts 22, the struts or posts 21 being driven into the bottom underlying the water. As shown in Figure 4 the water level is below the bottom of the platform. Nevertheless, as the water rises with the tide it may pass up into the spaces 23 between the beams 24.

The construction of the platform 20 may be the same as that shown in Figures 1 and 2. In Figure 4, however, is shown a somewhat modified construction of the platform when it is to be supported upon struts or posts. The beams 24 in such case may, if desired, be all of the same size but the arrangement thereof may be as described in connection with Figures 1 and 2 and the distribution thereof in the horizontal plane may be maintained by properly spacing the beams apart and arranging them symmetrically with respect to the central opening 16 of the platform.

It will be understood upon consideration of the description above given in connection with Figures 1 and 2 that although, in the embodiment of the invention as shown in Figure 4, the water masses may not lie between the beams 24, the symmetrical distribution of the mass of the platform, in view of its fixed relation to the instrument, causes the instrument to be acted upon symmetrically by the gravitational forces which exist due to the mass or masses of the platform itself. If the water rises between the beams 24 the interspersing of the water masses between the masses of the beams in the same manner as in Figures 1 and 2 is accomplished and avoidance of error is likewise secured. For this purpose, therefore, the platform which has its floor 26 bearing upon the upper edges of the beams 24, is constructed without closure of the spaces 23 or of the space 16 at the bottom side of the platform.

While in Figures 1 and 2 is shown a platform or float of rectangular, that is, square, form in the horizontal plane as being a practical embodiment of the invention, the platform may take various geometric forms in order to secure the desired symmetry and to make possible the distribution of the material throughout the structure. For example, as shown in Figure 5, the platform or float may be constructed with beams 30 forming the outside frame as a hexagon and with the beams 32 formed as a hexagon surrounding the central space 16 of the platform. Intermediate the beams 32 and 30 and also forming hexagons may be positioned the beams 34 and 35, which beams may be framed to radial beams 36 at the center of the sides of the hexagons and to beams 38 at the corners of the hexagons.

The arrangement shown in Figure 5 is purely diagrammatic and other constructions may be adopted. It will be understood, however, from a consideration of Figure 5 that the mass of materials of the platform are distributed symmetrically about a vertical at the center of the opening 16 and that by making the spaces between the beams 30, 32, 34 and 35 equal, or in some cases on such spacing as to make the water masses therebetween equal, and by symmetrically positioning the beams 36 and 38 as described, the mass of the material may be distributed evenly in the horizontal plane and space may be left between the members for rise of the water therebetween so that the masses of the beams may be interspersed by masses of water for the same purpose and with the same result as described in connection with Figures 1 and 2.

It will now be clear that by suitable formation of the members and by suitable framing the platform or float may be made circular in form or of octagonal form or may be made as a triangle or as a regular polygon of any convenient type. In some cases a simpler form such as a triangle may be suitable as, for example, when, with a torsion balance, readings are taken at 120 degrees around the vertical. In such case, by setting the platform with the perpendiculars upon the sides of the triangle coincident with the respective lines, 120 degrees apart, of setting or registration of the instrument, the symmetry of the triangle may be utilized. In other cases, however, for practical reasons such as the necessity of towing or otherwise moving the float upon the surface of the water, the rectangular form or a form having a greater number of sides may be preferable.

In Figure 1 the beams 12 in the squares 50 which are immediately adjacent to the central opening 16 are shown having their lengths extending parallel to the beams 9 or 11, as the case may be. This construction may be preferable in some cases because the mass of each beam 12 is symmetrical with respect to the center lines of its square which passes through the center of the opening 16, that is, through the instrument. In Figure 1 the beams 12 in the corner squares 52 of the platform extend all in one direction and therefore are like-extending with the beams 12 in two of the squares 50 which are adjacent the central opening but are transverse to the beams 12 in the other two squares 50. In the construction as shown in Figure 1 this necessitates laying the flooring in different directions over some of the squares as is shown in the figure. In some cases, however, it may be satisfactory to position the beams 12 in all of the squares with their lengths like-extending so that the flooring 14 may be laid thereover and extending transversely thereto in one direction over the whole covered area of the platform. It is further possible to effect a symmetrical distribution of the beams 12 by positioning these beams in the corner squares diagonally across these squares, for example, at 45 degrees.

In section in Figure 2 is shown the tent or cover 40 which may be of usual construction having a frame upon the outer side of which is applied a covering of canvas or other material. Upon the inner side of this frame also may be applied covering of the same or similar material to form a hollow space which serves for insulation to prevent changes in temperature and radiation from affecting the instrument. The lower portion of said frame may be constructed with base members 42 formed so that the edges thereof may roll upon rollers 44 shown in larger detail in Figure 3.

In a practical construction said rollers may be made of ferrules 46 having a plug of wood 47 tightly fitted thereto, into which plug is fastened a bushing 48. Through the bushing 48 passes a bolt or shaft 49 having such fit to the bushing 48 that the roller 44 may turn upon the bolt 49 as an axis. The bolt 49 may be, for example, of half inch diameter and the ferrule 46 may be, for example, a piece of 2 inch pipe. The bolt 49 may be held in a rail 51 which may be of wood, for example of 2 inch by 6 inch cross section, and of sufficient length to extend across the float. The rail 51 may be fastened to the flooring 14 or to the structure of the float and also to a base plate 52 which may be of wood of 2 inch by 4 inch section extending substantially the same length as the rail 51. The opposite end of the bolt 49 may be clamped by a strap 54 upon a bearing rail 56, which also may be of wood of a section, for example, 2 inches by 4 inches.

It will be understood from this description that the tent 40 may be rolled upon the rollers 44, of which there may be a number at spaced intervals along the rails 51 and 56, so that the tent 40 may be moved from the central position over the opening 16 where it is positioned during the operation of the instrument to the side of the float to leave the center opening 16 clear for insertion of the tripod or other support for the instrument as described in our copending application Serial No. 713,852, referred to above.

In order that the tent 40 may be moved from over the central opening 16 without interference by the tripod extending up through said opening, the base member 43 on one edge of the tent transversely to the base members 42 is parted and framed by means of members 45 to provide a small opening in the wall of the tent, which will provide clearance for the head of the tripod. Said opening, when the tent is in use, may be covered with a canvas or a door may be provided therefor. Thus it is merely necessary to remove the instrument from the tripod before rolling the tent from its position over the opening. After the tent is rolled aside the tripod may be removed from the opening without obstruction. Especially with the form of tripod disclosed in said copending application Serial No. 713,852, which is of demountable form utilizing in some cases long pipes inserted in a frame, it becomes possible for the workman to have easy access to the tripod and to insert and remove these pipes and to set the tripod without interference by the tent.

At 18 in dotted outline and by diagonals across the outlined rectangles are indicated the positions at which may be secured cells of limited volume such, for example, as may be provided by airtight cans of rectangular form made of sheet iron and of relatively small mass of material. Because of the limited volume in these cells and because of the symmetrical placement of these cells with respect to the vertical at the center of the central space 16 the distortion or error introduced into the measurements may satisfactorily be limited while securing an additional buoyancy for the float which, in some cases, may be necessary as referred to above. When, for example, the float is constructed of wood, which after a period of use may become somewhat waterlogged, the buoyancy of the float as a whole may be restored by adding cells of such limited volume in each thereof and by distributing them symmetrically as shown. These cells, as shown, may be placed in the spaces between the beams 5 and 12 or between the beams 3 and 12 and such a placement may be sufficient to secure the desired increase in buoyancy. If, however, additional buoyancy is requisite, additional cells of limited volume may be placed in other positions in the structure of the float by fastening these cells between the beams 12 and in all cases making certain that they are symmetrically distributed with respect to the vertical at the center of the central opening 16. Preferably these cells should be placed adjacent the outer edges of the float rather than in the spaces between the beams which are nearer the central opening. Thus there will be reduced the effect of the difference in mass caused by the air space as has been described above.

The embodiments of the invention as above described are merely typical and the drawings are somewhat diagrammatic to show the relation of the structural members and of the apparatus in connection with the geophysical instrument. Modifications of the form and arrangement of the parts may be made while carrying out the function of the members and of the apparatus as a whole.

In the particular embodiment described wood capable of floating has been suggested for the structural members. It is recognized that wood itself has this property of floating, that is, its average specific gravity or density is less than that of water, largely because of the air contained in or between the cells of the wood. Approximation of such a structural composition of wood material may be accomplished by forming the structural members or the parts of the platform or float with elements or pieces confining within the structural member small air spaces. If, as in the wood, such air spaces are interspersed between the elements or the pieces of the structural member, the even distribution of the mass of such elements or pieces may be accomplished and an average density of the structural member as a whole, not markedly different from that of water but sufficiently less than that of water to cause said structural member to float, may be obtained. All such variations which accomplish the even distribution of the mass of the material used in the construction of the platform or float as well as the symmetrical arrangement thereof are within the scope of the invention.

This application is a continuation in part of our copending application Serial No. 713,852, filed March 3, 1934.

Having thus described our invention what we claim is:

1. A platform for access to a geophysical instrument, said instrument being operably supported upon a portion of the earth's surface covered by water, which comprises structural elements each as a unit having a density approaching that of the water, said elements being assembled in such relation to each other that the masses thereof are distributed substantially evenly with respect to a vertical and so that said elements act as beams for a floor to be supported thereby to form the working surface, of a platform capable of supporting itself and an observer relative to the water and capable of being positioned adjacent to and extending about the instument with said vertical substantially coincident with said instrument, said platform being constructed so that any spaces between the elements are open for the water to enter to maintain the mass of materials surrounding said instrument substantially of uniformly distributed density.

2. A platform according to claim 1 in which at least some of said elements have an average density sufficiently less than that of water, to cause said structure to float.

3. A float for access to a geophysical instrument, said instrument being supported from the bottom underlying a body of water upon the earth's surface, which comprises a plurality of elements of wood capable of floating, said elements being framed together substantially evenly to distribute the mass of the wood in the horizontal plane and substantially symmetrically about a central opening in the float, said central opening being so formed as to provide space for support therein of said instrument clear of said float, said central opening and the spaces between said elements being clear at the bottom side of the elements for the water to rise to a common level in said spaces and in the central opening when said float is floating upon the water.

4. A platform for access to a geophysical instrument, said instrument being supported from the bottom underlying a body of water covering a portion of the earth's surface, which comprises structural elements assembled in such relation to each other that the masses thereof are distributed substantially symmetrically with respect to a median line of the field of action of the instrument, said platform being so constructed as to provide cells containing air of limited volume, said cells being distributed substantially symmetrically with respect to said median line and substantially evenly in the direction outwardly from the instrument in said field of action.

5. A platform for access to a geophysical instrument, said instrument being supported from the bottom underlying a body of water covering a portion of the earth's surface, which comprises structural elements assembled in such relation to each other that the masses thereof are distributed substantially symmetrically with respect to a vertical, said platform being constructed so that it may be positioned adjacent said instrument with said vertical substantially coincident with said instrument, said elements having the masses thereof substantially evenly distributed outwardly from said vertical in the horizontal plane, and water-tight cells containing air and of limited volume distributed substantially symmetrically with respect to said vertical and substantially evenly outwardly therefrom in the horizontal plane.

6. A platform according to claim 5 in which said cells are interspersed with said elements.

7. A platform according to claim 5 in which said cells are interspersed with said elements and spaces are left between at least some of the elements for water to rise therebetween when said platform is used as a float, said spaces being positioned substantially symmetrically with respect to said vertical and distributed substantially evenly outwardly therefrom in the horizontal plane.

8. A device for access to a geophysical instrument operably supported in relation to an area of the earth's surface covered with water, said device being constructed so as to be capable of supporting itself and an operator relative to the water and having the portions of the mass thereof in such symmetrical relation to each other that said device may be set in relation to said instrument so that said portions of said mass are distributed substantially symmetrically with respect to a median line of the field of action of the instrument, said device being so constructed that said portions of the mass thereof are spaced apart to form spaces therebetween open at the lower side of said device for the water to take its level between said portions when said device is positioned adjacent the surface of the water, whereby the water masses may become symmetrically distributed with respect to said field of action.

9. A structure for access to a geophysical instrument operably supported upon a portion of the earth's surface covered by water, which comprises structural elements each as a unit having a density approaching that of the water, said elements being assembled in the structure in such relation to each other that the masses thereof are substantially symmetrically distributed about a vertical and to form the structure so as to be capable of supporting itself and an operator relative to the water, said elements being spaced apart to form spaces therebetween open at the lower side of the structure for the water to take its level between said elements when said structure is positioned adjacent the surface of the water so that when said structure is positioned with said vertical substantially coincident with said instrument the mass of said structure is substantially symmetrically distributed with respect to said instrument.

10. A structure as defined in claim 9 in which a sufficient number of said structural elements have an average density less than that of the water and are so assembled that said structure is capable of floating on the water with the water between said elements so as to provide a composite mass of material surrounding said instrument having a density approximating that of the water.

11. A device for access to a geophysical instrument operably supported in relation to an area of the earth's surface covered with water, said device being constructed so as to be capable of supporting itself and an operator relative to the water, and having the portions of the mass thereof in such symmetrical relation to each other that said device may be set in relation to said instrument so that said portions of said mass are distributed substantially symmetrically with respect to a median line of the field of action of the instrument, said device being constructed so as to provide water-tight cells of limited volume, said cells being distributed in said device so as to become substantially symmetrically placed with respect to said median line when said device is so set in relation to the instrument.

12. Apparatus for making geophysical measurements upon an area of the earth's surface covered with water which comprises a geophysical instrument operably mounted in relation to said area of the earth's surface, and a member constructed to support itself and an operator relative to the water and arranged adjacent said instrument to provide access thereto, said member having the portions of the mass thereof substantially symmetrically placed with respect to a median line of the field of action of the instrument, said member being so constructed as to provide spaces between said portions of the mass thereof open at the lower side of the member for the water to rise therein when said member is positioned adjacent the surface of the water, said portions of the mass being so placed that said spaces are substantially symmetrically placed with respect to said field of action of the instrument.

13. Apparatus for making geophysical measurements upon an area of the earth's surface covered with water which comprises a geophysical instrument operably mounted in relation to said area of the earth's surface, and a member capable of supporting itself and an operator relative to the water and arranged adjacent said instrument to provide access thereto, said member being constructed of such material and having the masses thereof so placed with respect to a median line of the field of action of said instrument and so interspersed with masses of the water that with said masses of the water is provided in the field of action of the instrument a composite mass not substantially different in its mass effect from that of the water.

FRANZ JULIUS GERHARD NEUMANN.
WERNER RUDOLF HAUBOLD.